(12) United States Patent
Yang

(10) Patent No.: US 8,562,464 B2
(45) Date of Patent: Oct. 22, 2013

(54) MULTI-STAGE CONTINUOUS VARIABLE TRANSMISSION DEVICE IN MULTI-SHIFT PARALLEL CONNECTION TRANSMISSION

(76) Inventor: Tai-Her Yang, Dzan-Hwa (TW)

(*) Notice: Subject to any disclaimer, the term of this patent is extended or adjusted under 35 U.S.C. 154(b) by 944 days.

(21) Appl. No.: 12/320,385

(22) Filed: Jan. 26, 2009

(65) Prior Publication Data
US 2009/0197713 A1 Aug. 6, 2009

Related U.S. Application Data

(60) Provisional application No. 61/006,832, filed on Feb. 1, 2008.

(51) Int. Cl.
*F16H 9/16* (2006.01)
*F16H 55/56* (2006.01)

(52) U.S. Cl.
USPC .............................................. 474/32

(58) Field of Classification Search
USPC .......... 474/58, 60, 70, 73, 76; 477/37, 39, 41, 477/42, 44, 46
See application file for complete search history.

(56) References Cited

U.S. PATENT DOCUMENTS

| 2,809,535 | A | * | 10/1957 | Hein et al. | 477/12 |
| 3,926,020 | A | * | 12/1975 | Dantowitz et al. | 474/11 |
| 5,720,686 | A | * | 2/1998 | Yan et al. | 475/211 |
| 5,820,508 | A | * | 10/1998 | Konig et al. | 475/210 |
| 5,941,789 | A | * | 8/1999 | McCarrick et al. | 475/214 |

* cited by examiner

*Primary Examiner* — William A Rivera
*Assistant Examiner* — Henry Liu
(74) *Attorney, Agent, or Firm* — Bacon & Thomas, PLLC

(57) ABSTRACT

The invention is constituted by at least two continuous variable transmission devices in different ranges of speed ratios, wherein a clutching device is installed between the driven pulley of the high shift continuous variable transmission device and the driven pulley of the low shift continuous transmission and an unidirectional transmission device or a torque limiting clutching device is installed between the driven pulley and the output shaft of each shift.

20 Claims, 8 Drawing Sheets

MULTI-STAGE CONTINUOUS VARIABLE TRANSMISSION DEVICE IN MULTI-SHIFT PARALLEL CONNECTION TRANSMISSION

BACKGROUND OF THE INVENTION (a) Field of the Invention

The operation schemes of continuous transmission for various known continuous variable transmission devices of different shafts include:

The spacing between the variable spacing transmission V-belt grooves of driving and driven pulleys is modulated, whereby the operative belt transmission radial distance of the driving pulley or the driven pulley is changed to further change the transmission speed ratio between the driving pulley and the driven pulley;

The above said spacing modulation for variable spacing transmission V-belt grooves of driving or driven pulleys of the continuous variable transmission device is required to be driven by one or more than one kinds of axial driving forces including:

1. Through a variable centrifugal force generation mechanism by changes of the rotational speed of the input shaft to generate a variable axial driving force whereby to change the spacing of the transmission V-belt grooves of the driving pulley;

2. Through a variable centrifugal force generating mechanism by changes of the rotational speed of the output shaft to generate a variable axial driving force whereby to change the spacing of the transmission V-belt grooves of the driven pulley;

3. Through a variable axial driving force generating mechanism by changes of the output shaft torque to generate a variable axial driving force whereby to change the spacing of the transmission V-belt grooves of the driving pulley;

4. Through a variable axial driving force generating mechanism by changes of the output shaft torque to generate a variable axial driving force whereby to change the spacing of the transmission V-belt grooves of the driven pulley;

5. The driving or driven pulley is provided an axial prepressed spring, whereby the driving or driven pulley is pulled by the belt type transmission component to generate an axial driving force, whereby to change the variable spacing of the transmission V-belt grooves of both or either of the driving or driving pulley;

The above said 1~5 methods are passive operations of continuous variable transmission function;

6. A linear driving force actively generated manually, or by mechanical power, electromagnetic effect, hydraulically or pneumatically driven linear driving device; or a revolving kinetic energy generated by driving the electric motor, hydraulic motor or pneumatic motor is converted through a mechanical transmission device to an axial linear type driving force whereby to further change the spacing of variable spacing transmission V-belt grooves of both or either of the driving pulley or driven pulley; said method is the active operation of continuous variable transmission.

(b) Description of the Prior Art

Types of conventional continuous variable transmission devices of different input and output shafts structures are numerous including: rubber belt type, metal belt type, chain type, or electronic (ECVT) type, friction disk type or known continuous variable transmission device of different shafts type, etc.

SUMMARY OF THE INVENTION

The multi-stage continuous variable transmission device in multi-shift parallel connection transmission is passively operated by an axial driving force generated by operating torque or rotational speed controlled manually or by axially prepressed springs on the driving or driven pulley, or actively operated by manual, electric, mechanical, hydraulic or pneumatic powers and further referring to input preset operating modes, detected speeds and torques, etc. thereby to modulate and operate speed ratio of the continuous variable transmission thereof.

Although the speed ratio of the continuous variable transmission device of different shafts type can be automatically modulated according to rotational speed variations of the driving pulley input shaft and sizes of the loading torque at loading side, which is advantageous for convenient operation, it still has imperfections such as the insufficient range of speed ratio.

The multi-stage continuous variable transmission device in multi-shift parallel connection transmission of the invention is innovatively disclosed to comprise two or more than two sets of continuous variable transmission devices, wherein each adjacent unit has different range of speed ratio including the low shift continuous variable transmission device of different shafts type, the high shift continuous variable transmission device of different shafts type, or additional lower or higher shift continuous variable transmission device of different shafts type to be installed as needed, wherein number of additional shifts can be increased as needed without limitation. A clutching device is installed between the driven pulley of each shift continuous variable transmission device and the output shaft of its neighboring lower shift continuous variable transmission device, and each shift can be installed with an unidirectional transmission device or a torque limiting clutching device between the driven pulley and its output shaft thereof except for the highest shift. Further, except for the highest shift, the driving pulley whereof is directly driven by the input shaft, while for the other shifts, the driving pulley whereof can either be directly driven by the input shaft, or driven by the input shaft via an additional unidirectional transmission device or a torque limiting device. Further, when a deceleration type continuous variable transmission device is used for low shift continuous variable transmission device to operate at minimum deceleration ratio or close to minimum deceleration ratio, or an acceleration type continuous variable transmission device is used for low shift continuous variable transmission device to operate at maximum acceleration ratio or close to maximum acceleration ratio, whereby when the rotational speed of the output shaft reaches or exceeds the setting speed, the clutching device is operated to close so as to allow the output shaft driven by the driven pulley of the low shift continuous variable transmission device to connect with the driven pulley of its neighboring relatively higher shift continuous variable transmission device.

The aforesaid low shift continuous variable transmission device, high shift continuous variable transmission device and higher shift continuous variable transmission device are defined as: When driving pulleys of said low shift continuous variable transmission device, high shift continuous variable transmission device, and higher shift continuous variable transmission device are driven at the same rotational speed, the rotational speed output of the driven pulley of each shift continuous variable transmission device is varied due to speed ratio differences to appear the following relationships:

1. Highest rotational speed output of the driven pulley of the low shift continuous variable transmission device<highest rotational speed output of the driven pulley of the high shift continuous variable transmission device<highest rotational speed output of the driven pulley of the higher shift continuous variable transmission device;

2. Lowest rotational speed output of the driven pulley of the low shift continuous variable transmission device<lowest rotational speed output of the driven pulley of the high shift continuous variable transmission device<lowest rotational speed output of the driven pulley of the higher shift continuous variable transmission device.

DESCRIPTION OF MAIN COMPONENT SYMBOLS

Figure 1:
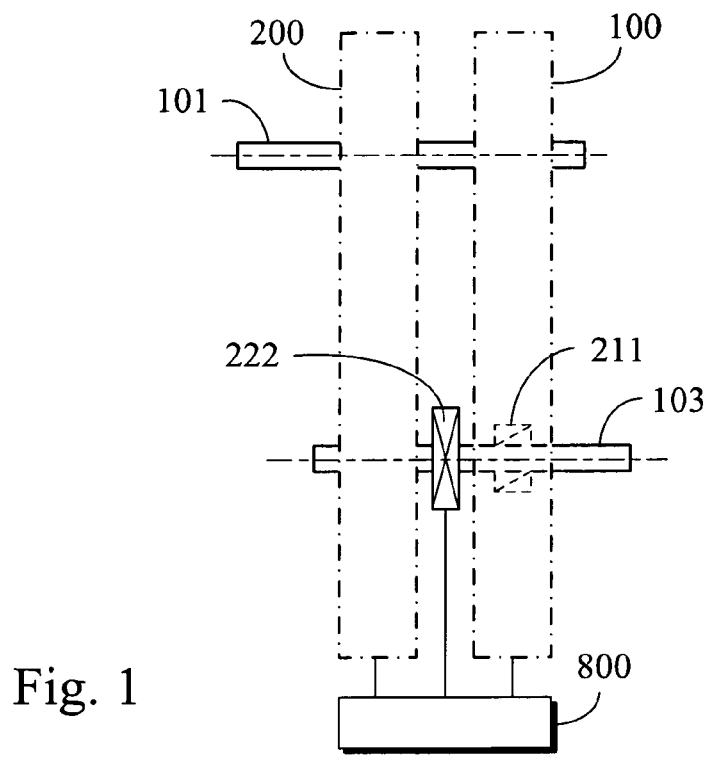
FIG. 1 is an embodiment schematic view of the invention which comprises two sets of high and low shifts continuous variable transmission devices of different shafts type in parallel connection, wherein an unidirectional transmission device is further installed between the output shaft and the driven pulley of the low shift continuous variable transmission device of different shafts type, and a clutching device is installed between the output shaft driven by the driven pulley of the low shift continuous variable transmission device of different shafts type and the driven pulley of the high shift continuous variable transmission device of different shafts type.

100: Low shift continuous variable transmission device of different shafts type
101: Input shaft
103: Output Shaft
200: high shift continuous variable transmission device of different shafts type
211, 311: Unidirectional transmission device
212, 312: Torque limiting clutching device
222, 333: Clutching device
300: higher shift continuous variable transmission device of different shafts type
302, 402: Speed change pulley train
800: Driving control device

DETAILED DESCRIPTION OF THE PREFERRED EMBODIMENTS

The multi-stage continuous variable transmission device in multi-shift parallel connection transmission is passively operated by an axial driving force generated by operating torque or rotational speed to execute axial drive to the driving or driven pulley and further cooperated with manual manipulation or provided with axially pre-pressed springs to constitute the continuous variable transmission function, or actively operated by manual, electric, mechanical, hydraulic or pneumatic powers to constitute the continuous variable transmission function and further referring to input preset operating modes, detected speeds and torques, etc. thereby to modulate and operate the continuous variable transmission speed ratio thereof.

Although speed ratio of the continuous variable transmission device of different shafts type can be automatically modulated according to rotational speed variations of the driving pulley input shaft and sizes of loading torque at loading side, which is advantageous for convenient operation, it still has imperfections such as the insufficient range of speed ratio;

The multi-stage continuous variable transmission device in multi-shift parallel connection transmission of the invention is originally disclosed to comprise two or more than two sets of continuous variable transmission devices, wherein each adjacent unit having different range of speed ratio including low shift continuous variable transmission device of different shafts type, high shift continuous variable transmission device of different shafts type, or additional lower or higher shift continuous variable transmission device of different shafts type to be installed as needed, wherein number of additional shifts can be increased as needed without limitation. A clutching device is installed between the driven pulley of each shift continuous variable transmission device and the output shaft of its neighboring lower shift continuous variable transmission device, and each shift can be installed with an unidirectional transmission device or a torque limiting clutching device between the driven pulley and its output shaft thereof except for the highest shift. Further, except for the highest shift, the driving pulley whereof is directly driven by the input shaft, while for the other shifts, the driving pulley whereof can either be directly driven by the input shaft, or driven by the input shaft via an additional unidirectional transmission device or torque limiting device. Further, when a deceleration type continuous variable transmission device is used for low shift continuous variable transmission device to operate at minimum deceleration ratio or close to minimum deceleration ratio status, or an acceleration type continuous variable transmission device is used for low shift continuous variable transmission device to operate at maximum acceleration ratio or close to maximum acceleration ratio status, whereby when rotational speed of the output shaft reaches or exceeds the setting speed, the clutching device is operated to close so as to allow the output shaft driven by the driven pulley of the low shift continuous variable transmission device to connect with the driven pulley of its neighboring relatively higher shift continuous variable transmission device.

The aforesaid low shift continuous variable transmission device, high shift continuous variable transmission device and higher shift continuous variable transmission device are defined as: When driving pulleys of said low shift continuous variable transmission device, high shift continuous variable transmission device, and higher shift continuous variable transmission device are driven at the same rotational speed, the rotational speed output of the driven pulley of each shift continuous variable transmission device is varied due to speed ratio differences to appear the following relationships:

1. Highest rotational speed output of the driven pulley of the low shift continuous variable transmission device<highest rotational speed output of the driven pulley of the high shift continuous variable transmission device<highest rotational speed output of the driven pulley of the higher shift continuous variable transmission device;

2. Lowest rotational speed output of the driven pulley of the low shift continuous variable transmission device<lowest rotational speed output of the driven pulley of the high shift continuous variable transmission device<lowest rotational speed output of the driven pulley of the higher shift continuous variable transmission device.

Said multi-stage continuous variable transmission device in multi-shift parallel connection transmission are constituted by the following:

By taking two sets of continuous variable transmission devices to constitute the two stage continuous variable transmission devices as the example to describe in the following:

As shown in FIG. 1, besides the relevant mechanisms in the conventional continuous variable transmission devices, the multi-stage continuous variable transmission device in multi-shift parallel connection transmission mainly comprises:

A low shift continuous variable transmission device of different shafts type 100: It is a continuous variable transmission device of different input and output shafts structure comprises at least one kind of rubber belt type, metal belt type, chain type, or electronic (ECVT) type, friction disk type continuous variable transmission devices, wherein transmission speed ratio thereof can be either passively automatically modulated by following torque or following rotational speed; or actively modulated by applying a linear driving force either generated by an externally powered linear driving device or by a revolving driving device via a mechanical transmission device for conversion to change spacing between transmission V-belt grooves of both or either of driving and driven pulleys.

Figure 2:
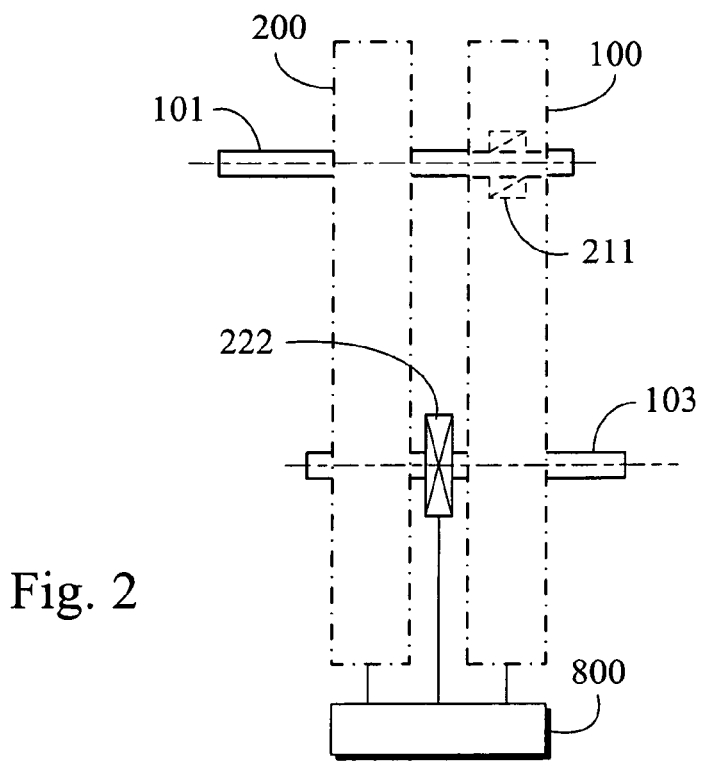
FIG. 2 is an embodiment schematic view of the invention which comprises two sets of continuous variable transmission devices of different shafts type in parallel connection, wherein an unidirectional transmission device is installed between the input shaft and the driving pulley of the low shift continuous variable transmission device of different shafts type, and a clutching device is installed between the output shaft driven by the driven pulley of the low shift continuous variable transmission device of different shafts type and the driven pulley of the high shift continuous variable transmission device of different shafts type.
Figure 3:
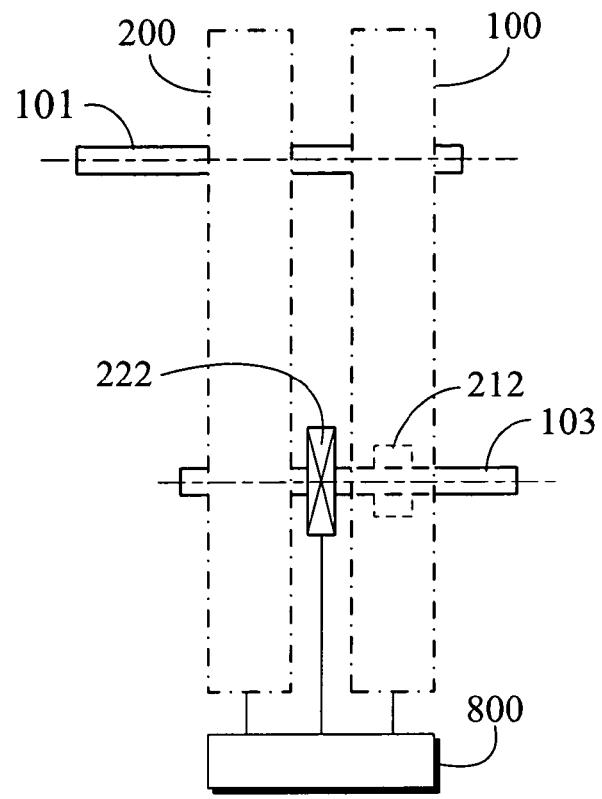
FIG. 3 is an embodiment schematic view of the invention which comprises two sets of continuous variable transmission devices of different shafts type in parallel connection, wherein a torque limiting clutching device is installed between the output shaft and the driven pulley of the low shift continuous variable transmission device of different shafts type, and a clutching device is installed between the output shaft driven by the driven pulley of the low shift continuous variable transmission device of different shafts type and the driven pulley of the high shift continuous variable transmission device of different shafts type.
Figure 9:
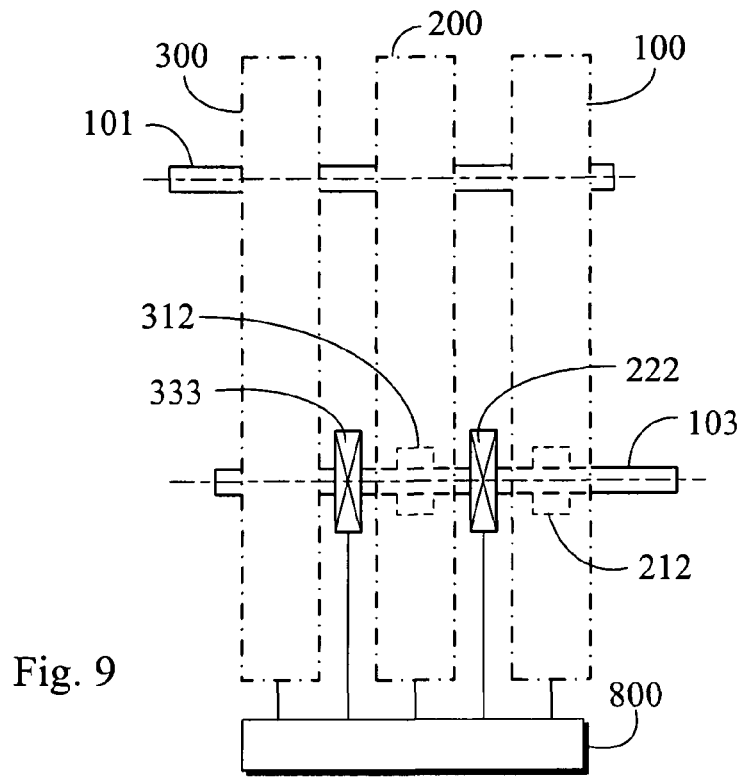
FIG. 9 is an embodiment schematic view of the invention showing that the structure in FIG. 3 is further installed with a higher shift continuous variable transmission device of different shafts type, and a clutching device is further installed between the driven pulley of the higher shift continuous variable transmission device of different shafts type and the output shaft driven by the driven pulley of the high shift continuous variable transmission device of different shafts type, as well as a torque limiting clutching device is further installed between the driven pulley and the output shaft of the high shift continuous variable transmission device of different shafts type.

An input shaft 101: It is the rotating shaft to receive a revolving kinetic energy input, whereby said revolving kinetic energy is transmitted to the driving pulley of the low shift continuous variable transmission device of different shafts type 100 and to the driving pulley of the high shift continuous variable transmission device of different shafts type 200;

High shift continuous variable transmission device of different shafts type 200: It is constituted by a higher shift continuous variable transmission device of different shafts type relative to a neighboring low shift continuous variable transmission device of different shafts type 100 including: the maximum acceleration speed ratio of the high shift continuous variable transmission device of different shafts type 200 is larger than the maximum acceleration speed ratio of the low shift continuous variable transmission device of different shafts type 100, or minimum acceleration speed ratio of high shift continuous variable transmission device of different shafts type 200 is larger than the minimum acceleration speed ratio of the low shift continuous variable transmission device of different shafts type 100, or maximum deceleration speed ratio of the high shift continuous variable transmission device of different shafts type 200 is smaller than the maximum deceleration speed ratio of the low shift continuous variable transmission device of different shafts type 100, or minimum deceleration speed ratio of the high shift continuous variable transmission device of different shafts type 200 is smaller than minimum deceleration speed ratio of the low shift continuous variable transmission device of different shafts type 100, wherein it is constituted by the continuous variable transmission device of different input and output shafts type comprising at least one kind of rubber belt type, metal belt type, chain type, or electronic (ECVT) type, friction disk type continuous variable transmission devices, further the transmission speed ratio whereof can be either passively automatically modulated by following torque or following rotational speed; or actively modulated by applying a linear driving force either generated by an externally powered linear driving device or by a revolving driving device via a mechanical transmission device for conversion to change spacing between transmission V-belt grooves of both or either of driving and driven pulleys;

An output shaft 103: it is the rotating shaft to supply revolving kinetics energy output for driving the load, whereby the revolving kinetics energy is transmitted from the driven pulley of the low shift continuous variable transmission device of different shafts type 100, or transmitted from the driven pulley of the high shift continuous variable transmission device of different shafts type 200 through the clutching device 222 to drive the load;

Unidirectional transmission device 211: It is constituted by unidirectional bearing, unidirectional clutches, or unidirectional transmission mechanisms or devices, etc. in radial or axial structure with unidirectional transmission functions, wherein it can be installed between the output shaft 103 and the driven pulley of the low shift continuous variable transmission device of different shafts type 100 as shown in FIG. 1. The transmission function whereof is that: When the rotational speed of the driven pulley of the low shift continuous variable transmission device of different shafts type 100 is higher than the rotational speed of the output shaft 103 in the same revolving direction, kinetic energy is transmitted from the driven pulley of the low shift continuous variable transmission device of different shafts type 100 to the output shaft 103. When the clutching device 222 is closed so that the output shaft 103 and the driven pulley of the high shift continuous variable transmission device of different shafts type 200 is connected, if the rotational speed of the output shaft 103 is higher than the rotational speed of the driven pulley of the low shift continuous variable transmission device of different shafts type 100, then the unidirectional transmission device 211 is in no load operation;

Said unidirectional transmission device 211 can be installed between the input shaft 101 and the driving pulley of the low shift continuous variable transmission device of different shafts type 100 as shown in FIG. 2, the transmission function whereof is that: When the rotational speed of the driving pulley of the low shift continuous variable transmission device of different shafts type 100 is lower than the rotational speed of the input shaft 101 in the same revolving direction, the kinetic energy is transmitted from the input shaft 101 to the driving pulley of the low shift continuous variable transmission device of different shafts type 100. When the clutching device 222 is closed so that the output shaft 103 and the driven pulley of the high shift continuous variable transmission device of different shafts type 200 is connected, if rotational speed of the input shaft 101 is lower than the rotational speed of the driving pulley of the low shift continuous variable transmission device of different shafts type 100, then the unidirectional transmission device 211 is in no load operation;

A torque limiting clutching device 212: It is constituted by sliding type or clutching type torque limiting devices in radial or axial structures for replacing the unidirectional transmission device 211 to be installed between the driven pulley of the continuous variable transmission device of different shafts type 100 and the output shaft 103 (as shown in FIGS. 3, 9, 12), or to be installed between the driving pulley of the continuous variable transmission device of different shafts type 100 and the output shaft 101 (as in FIGS. 4, 10, 11), whereby when rotational speed of the output shaft 103 is raised to or over the setting speed, the clutching device 222 is closed and the torque limiting clutching device 212 is slid or released when there is a rotational speed difference causing torque difference to exceed the setting value between the output shaft 103 and the driven pulley of the continuous variable transmission device of different shafts type 100, or between the input shaft 101 and the driving pulley of the continuous variable transmission device of different shafts type 100, wherein said torque limiting clutching device 212 can be selected to be installed or not to be installed as needed;

Clutching device 222: It can be optionally selected as needed to be constituted by 1) passively operated centrifugal type clutches by centrifugal force or torque operated type passive clutches, or 2) clutches actively operated by manual or mechanical power, or driven by electromagnetic power or hydraulic or pneumatic pressure to be actively randomly controlled manually or controlled by a built-in or externally installed rotational speed detector device or torque detector device, whereby the detected signals are processed by the driving control device 800 to actively control the clutching device 222 for releasing or closing operations. The clutching device 222 is for installing between the driven pulley of the high shift continuous variable transmission device of different shafts type 200 and the output shaft 103, wherein it can be an independent structure or to integrate with the high shift continuous variable transmission device of different shafts type 200, or to integrate with the low shift continuous variable transmission device of different shafts type 100; or the three of the high shift continuous variable transmission device of different shafts type 200, the low shift continuous variable transmission device of different shafts type 100 the and clutching device 222 can be integrated, thereby to close for kinetic energy transmission or to release for cutting off kinetic energy transmission.

A driving control device 800: It is installed according to characteristics of selected low shift continuous variable transmission device of different shafts type 100, high shift continuous variable transmission device of different shafts type 200 and clutching device 222. Said driving control device is provided with a driving power source which is constituted by electric power supply unit, hydraulic oil pressure supply unit, or pneumatic pressure supply unit and relevant electric power control unit, hydraulic oil pressure control unit, or pneumatic pressure control unit to control speed ratio of both the low shift continuous variable transmission device of different shafts type 100 and the high shift continuous variable transmission device of different shafts type 200, or to control the closing or releasing operating function of the clutching device 222;

If automatic torque following speed ratio modulating mechanism, or rotational speed following speed ratio modulating mechanism are selected for low shift continuous variable transmission device of different shafts type 100 and high shift continuous variable transmission device of different shafts type 200, they both are belong to passively operated continuous variable transmission devices, if a passively operated centrifugal type clutching device or a torque operated type passive clutching device is also selected for the clutching device 222, then driving control device 800 is not needed to be installed;

If an active controlled type clutching device is selected for the clutching device 222, or an actively operated continuous variable transmission device requiring an external power source for speed ratio modulation is selected for the two or at least one of the low shift continuous variable transmission device of different shafts type 100 or the high shift continuous variable transmission device of different shafts type 200, then a driving control device 800 shall be installed to actively control the speed ratio of the low shift continuous variable transmission device of different shafts type 100 or the high shift continuous variable transmission device of different shafts type 200 as an external power source is required for the speed ratio control, or to control the actively operated type clutching device 222 for closing or releasing functions whereof.

The multi-stage continuous variable transmission device in multi-shift parallel connection transmission constituted by above said main structures includes that the driving pulley of the low shift continuous variable transmission device of different shafts type 100 and the driving pulley of the high shift continuous variable transmission device of different shafts type 200 are driven by the input shaft 101 and a clutching device 222 is installed between the driven pulley train of the high shift continuous variable transmission device of different shafts type 200 and the output shaft 103; and an unidirectional transmission device 211 is further optionally installed as needed between the output shaft 103 and the driven pulley of the low shift continuous variable transmission device of different shafts type 100, wherein when rotational speed of the output shaft 103 is higher than that of the driven pulley of the low shift continuous variable transmission device of different shafts type 100 in the same revolving direction, the unidirectional transmission device 211 is in no load operation; when the output shaft 103 is operated in high speed, if deceleration type continuous various transmission is used to operate at minimum deceleration speed ratio or near minimum deceleration speed ratio status, or an acceleration type continuous variable transmission device is used to operate at maximum acceleration speed ratio or near maximum speed ratio status in low shift continuous variable transmission device of different shafts type 100, wherein when rotational speed of the input shaft 101 is high enough to raise that of the output shaft 103 to the setting rotational speed, then the clutching device 222 is closed so that the driven pulley of the high shift continuous variable transmission device of different shafts type 200 and the output shaft 103 is connected, thereby the rotational speed of the output shaft 103 driven by the driven pulley of the high shift continuous variable transmission device of different shafts type 200 through the clutching device 222 is higher or equal to the rotational speed of the driven pulley of the low shift continuous variable transmission device of different shafts type 100 in the same revolving direction, and the rotational speed whereof can be further accelerated by the input shaft 101 to further produce higher rotational speed to drive the load. At the status thereof, it is characterized in that the transmission kinetic energy originally transmitted by the low shift continuous variable transmission device of different shafts type 100 is changed to be transmitted by the high shift continuous variable transmission device of different shafts type 200 and clutching device 222, thereby the revolving kinetic energy thereof is used to drive the output shaft 103 to further drive the load, while when the rotational speed of the output shaft 103 is gradually reduced to the setting rotational speed, the clutching device 222 is released, the revolving kinetic energy of the input shaft 101 is then transmitted by the low shift continuous variable transmission device 100 to drive the output shaft 103 to further drive the load.

The unidirectional transmission device 211 is installed between the driven pulley of the low shift continuous variable transmission device 100 and the output shaft 103 as shown in said embodiment of FIG. 1; however, as needed by applications, an unidirectional transmission device 211 can be installed between the driving pulley of the low shift continuous variable transmission device 100 and the input shaft 101;

FIG. 2 is an embodiment schematic view of the invention which comprises two sets of continuous variable transmission devices of different shafts type in parallel connection, wherein an unidirectional transmission device 211 is installed between the input shaft 101 and the driving pulley of the low shift continuous variable transmission device of different shafts type 100, and a clutching device 222 is installed between the output shaft 103 driven by the driven pulley of the low shift continuous variable transmission device of different shafts type 100 and the driven pulley of the high shift continuous variable transmission device of different shafts type 200; wherein the differences in constitution and operation between FIG. 1 and FIG. 2 are the following:

1. The unidirectional transmission device 211 is installed between the input shaft 101 and the driving pulley of the low shift continuous variable transmission device of different shafts type 100;

2. When the clutching device 222 is closed so that the driven pulley of the high shift continuous variable transmission device of different shafts type 200 and the output shaft 103 is connected, if the rotational speed of the driving pulley of the low shift continuous variable transmission device of different shafts type 100 is higher than that of the input shaft 101 in the same revolving direction, the unidirectional transmission device 211 is in no load operation;

Said unidirectional transmission device 211 in the embodiment shown in FIG. 1 can also be replaced by a torque limiting clutching device 212;

FIG. 3 is an embodiment schematic view of the invention which comprises two sets of continuous variable transmission devices of different shafts type in parallel connection, wherein a torque limiting clutching device 212 is installed between the output shaft 103 and the driven pulley of the low shift continuous variable transmission device of different shafts type 100, and a clutching device 222 is installed between the output shaft 103 driven by the driven pulley of the low shift continuous variable transmission device of different shafts type 100 and the driven pulley of the high shift continuous variable transmission device of different shafts type 200.

The differences in constitution and operation between FIG. 3 and FIG. 1 are the following:

1. A torque limiting clutching device 212 is constituted by sliding type or clutching type torque limiting devices in radial or axial structures for replacing the unidirectional transmission device 211;

2. A torque limiting clutching device 212 is installed between the driven pulley of the low shift continuous variable transmission device of different shafts type 100 and the output shaft 103, when rotational speed of the output shaft 103 is raised to the setting speed, the clutching device 222 is closed, whereby the torque limiting clutching device 212 is slid or released when there is a rotational speed difference causing torque difference to exceed the setting value between the output shaft 103 and the driven pulley of the low shift continuous variable transmission device of different shafts type 100.

Figure 4:
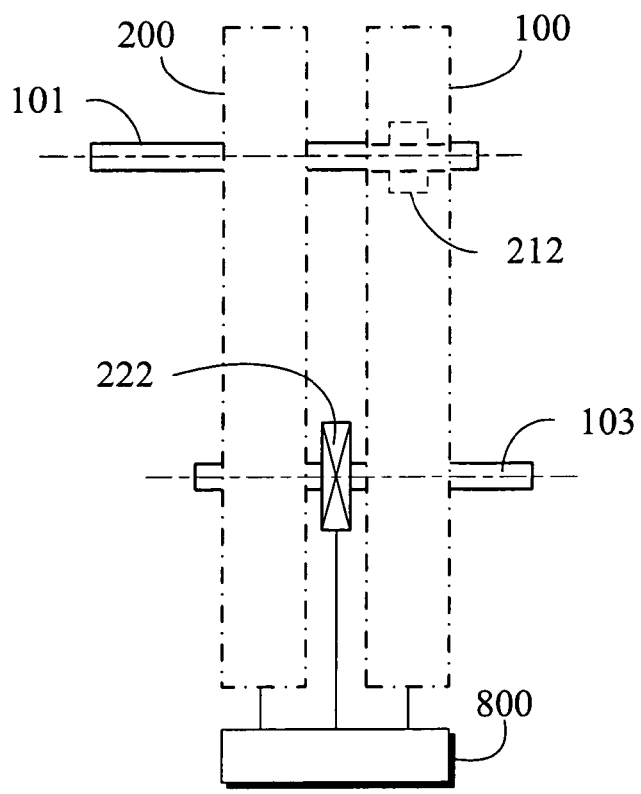
FIG. 4 is an embodiment schematic view of the invention which comprises two sets of continuous variable transmission devices of different shafts type in parallel connection, wherein a torque limiting clutching device is further installed between the input shaft and the driving pulley of the low shift continuous variable transmission device of different shafts type, and a clutching device is installed between the output shaft driven by the driven pulley of the low shift continuous variable transmission device of different shafts type and the driven pulley of the high shift continuous variable transmission device of different shafts type.

Said unidirectional transmission device 211 in the embodiment shown in FIG. 2 can also be replaced by a torque limiting clutching device 212;

FIG. 4 is an embodiment schematic view of the invention which comprises two sets of continuous variable transmission devices of different shafts type in parallel connection, wherein a torque limiting clutching device 212 is further installed between the input shaft 101 and the driving pulley of the low shift continuous variable transmission device of different shafts type 100, and a clutching device 222 is installed between the output shaft 103 driven by the driven pulley of the low shift continuous variable transmission device of different shafts type 100 and the driven pulley of the high shift continuous variable transmission device of different shafts type 200.

The differences in constitution and operation between FIG. 4 and FIG. 2 are the following:

1. A torque limiting clutching device 212 is constituted by sliding type or clutching type torque limiting devices in radial or axial structures for replacing the unidirectional transmission device 211;

2. A torque limiting clutching device 212 is installed between the driving pulley of the low shift continuous variable transmission device of different shafts type 100 and the input shaft 101, when rotational speed of the output shaft 103 is raised to the setting speed, the clutching device 222 is closed, whereby the torque limiting clutching device 212 is slid or released when there is a rotational speed difference causing torque difference to exceed the setting value between the output shaft 103 and the driven pulley of the low shift continuous variable transmission device of different shafts type 100.

Number of stages of the continuous variable transmission device of different shaft type of said multi-stage continuous variable transmission device in multi-shift parallel connection transmission of present invention can be optionally increased as needed to enlarge the speed ratio range of continuous variable transmission. FIGS. 5~12 are embodiment schematic views of the invention showing that besides of the low shift continuous variable transmission device of different shafts type 100 and the high shift continuous variable transmission device of different shafts type 200, a higher shift continuous variable transmission device of different shafts type 300 is further installed to increase number of stages of the continuous variable transmission device so as to enlarge the speed ratio range of the continuous variable transmission device. As shown in FIGS. 5~12, the structure of additionally installed higher shift continuous variable transmission device of different shafts type 300 is the same as the high shift continuous variable transmission device of different shafts type 200, wherein said higher shift continuous variable transmission device of different shafts type 300 is constituted by the following:

Higher shift continuous variable transmission device of different shafts type 300: It is constituted by a higher shift continuous variable transmission device of different shafts type relative to a neighboring high shift continuous variable transmission device of different shafts type 200 including: the maximum acceleration speed ratio of the higher shift continuous variable transmission device of different shafts type 300 is larger than the maximum acceleration speed ratio of the high shift continuous variable transmission device of different shafts type 200, or the minimum acceleration speed ratio of the higher shift continuous variable transmission device of different shafts type 300 is larger than the minimum acceleration speed ratio of the high shift continuous variable transmission device of different shafts type 200, or the maximum deceleration speed ratio of the higher shift continuous variable transmission device of different shafts type 300 is smaller than the maximum deceleration speed ratio of the high shift continuous variable transmission device of different shafts type 200, or the minimum deceleration speed ratio of the higher shift continuous variable transmission device of different shafts type 300 is smaller than the minimum deceleration speed ratio of the high shift continuous variable transmission device of different shafts type 200, wherein it is constituted by the continuous variable transmission device of different input and output shafts type comprising at least one kind of rubber belt type, metal belt type, chain type, or electronic (ECVT) type, friction disk type continuous variable transmission devices, further the transmission speed ratio whereof can be either passively automatically modulated by following torque or following rotational speed; or actively modulated by applying a linear driving force either generated by an externally powered linear driving device or by a revolving driving device via a mechanical transmission device for conversion to change spacing between transmission V-belt grooves of both or either of the driving and driven pulley;

The maximum speed ratio of higher shift continuous variable transmission device of different shafts type 300 is larger than the maximum speed ratio of high shift continuous variable transmission device of different shafts type 200; the minimum speed ratio of higher shift continuous variable transmission device of different shafts type 300 is also larger than the minimum speed ratio of high shift continuous variable transmission device of different shafts type 200, wherein the driving pulley of the higher shift continuous variable transmission device of different shafts type 300 is driven by the input shaft 101. A clutching device 333 is installed between the driven pulley of the higher shift continuous variable transmission device of different shafts type 300 and the driven pulley of the high shift continuous variable transmission device of different shafts type 200, structure of said clutching device 333 is the same as that of the clutching device 222 to be constituted by the following:

Clutching device 333: It can be optionally selected as needed to be constituted by 1) passively operated centrifugal type clutches by centrifugal force, or 2) clutches actively operated by manual or mechanical power, or driven by electromagnetic power or hydraulic or pneumatic pressure to be actively randomly controlled manually or controlled by a built-in or externally installed rotational speed detector device or torque detector device, whereby the detected signals are processed by the driving control device 800 to actively control the clutching device 333 for releasing or closing operations. The clutching device 333 is for installing between the driven pulley of the higher shift continuous variable transmission device of different shafts type 300 and the output shaft 103, wherein it can be an independent structure or to integrate with higher shift continuous variable transmission device of different shafts type 300, or to integrate with high shift continuous variable transmission device of different shafts type 200; or the three of higher shift continuous variable transmission device of different shafts type 300, high shift continuous variable transmission device of different shafts type 200 and clutching device 333 can be integrated, thereby to close for kinetic energy transmission or to release for cutting off kinetic energy transmission; or to further integrally combine with the clutching device 222 and the low shift continuous variable transmission device of different shafts type 100.

Figure 5:
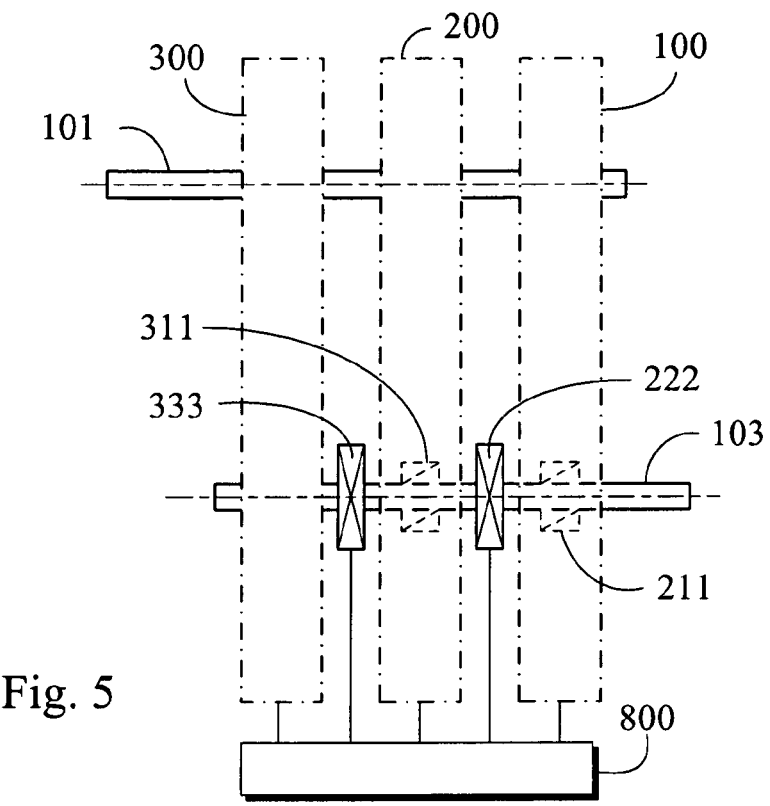
FIG. 5 is an embodiment schematic view of the invention showing that the structure in FIG. 1 is further installed with a higher shift continuous variable transmission device of different shafts type, and a clutching device is further installed between the driven pulley of the higher shift continuous variable transmission device of different shafts type and the output shaft driven by the driven pulley of the high shift continuous variable transmission device of different shafts type, as well as an unidirectional transmission device is further installed between the driven pulley and the output shaft of the high shift continuous variable transmission device of different shafts type.
Figure 6:
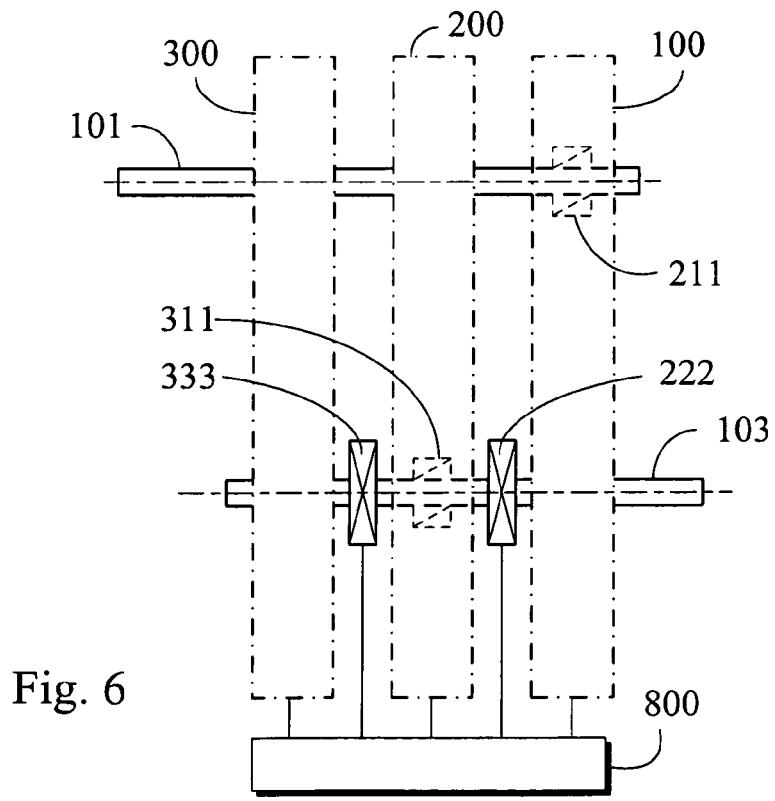
FIG. 6 is an embodiment schematic view of the invention showing that the structure in FIG. 2 is further installed with a higher shift continuous variable transmission device of different shafts type, and a clutching device is further installed between the driven pulley of the higher shift continuous variable transmission device of different shafts type and the output shaft driven by the driven pulley of the high shift continuous variable transmission device of different shafts type, as well as an unidirectional transmission device is further installed between the driven pulley and the output shaft of the high shift continuous variable transmission device of different shafts type.
Figure 7:
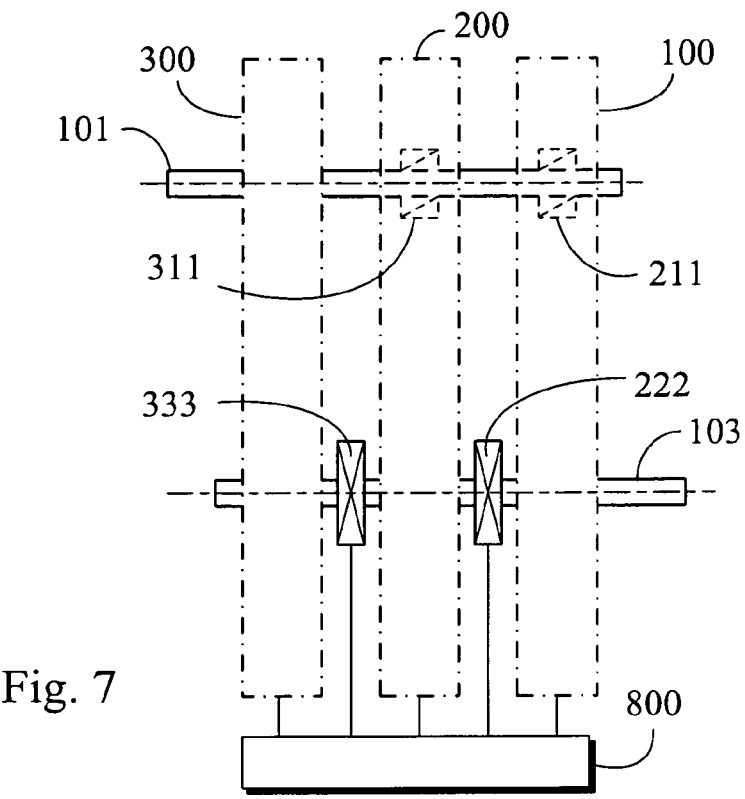
FIG. 7 is an embodiment schematic view of the invention showing that the structure in FIG. 1 is further installed with a higher shift continuous variable transmission device of different shafts type, and a clutching device is further installed between the driven pulley of the higher shift continuous variable transmission device of different shafts type and the output shaft driven by the driven pulley of the high shift continuous variable transmission device of different shafts type, as well as an unidirectional transmission device is further installed between the input shaft and the driving pulley of the high shift continuous variable transmission device of different shafts type.
Figure 8:
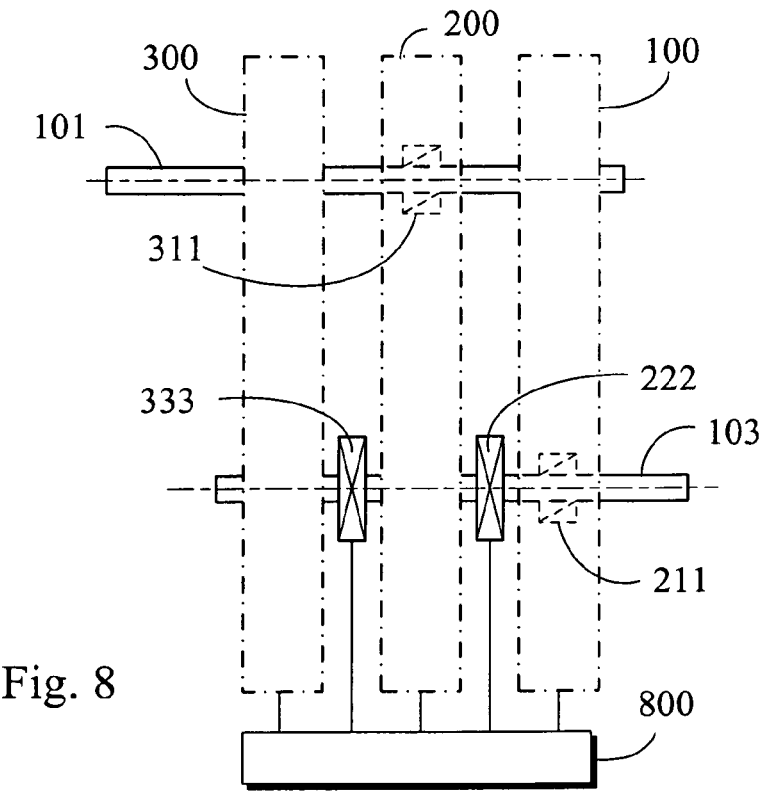
FIG. 8 is an embodiment schematic view of the invention showing that the structure in FIG. 2 is further installed with a higher shift continuous variable transmission device of different shafts type, and a clutching device is further installed between the driven pulley of the higher shift continuous variable transmission device of different shafts type and the output shaft driven by the driven pulley of the high shift continuous variable transmission device of different shafts type, as well as an unidirectional transmission device is further installed between the input shaft and the driving pulley of the high shift continuous variable transmission device of different shafts type.
Figure 10:
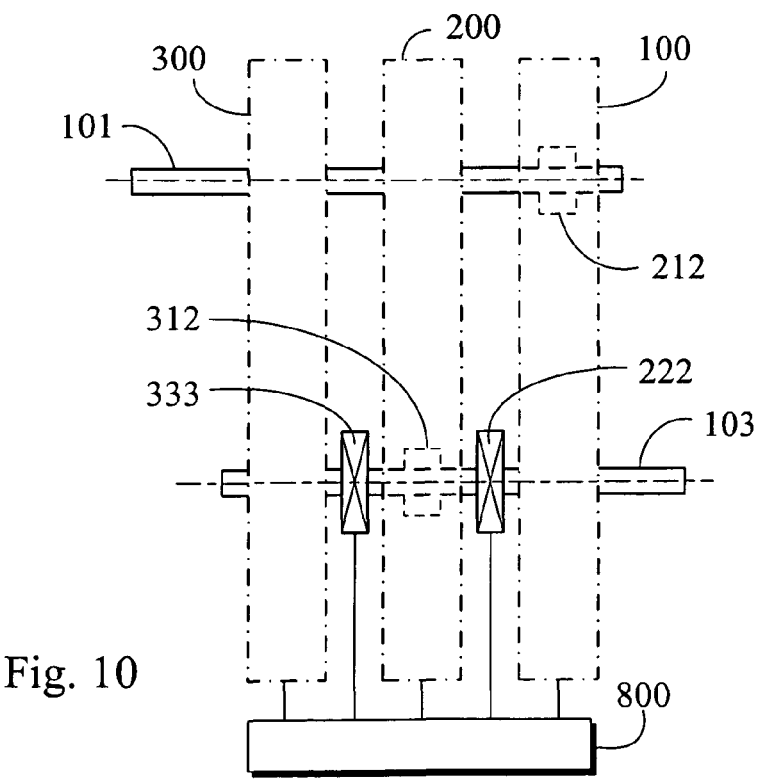
FIG. 10 is an embodiment schematic view of the invention showing that the structure in FIG. 4 is further installed with a higher shift continuous variable transmission device of different shafts type, and a clutching device is further installed between the driven pulley of the higher shift continuous variable transmission device of different shafts type and the output shaft driven by the driven pulley of the high shift continuous variable transmission device of different shafts type, as well as a torque limiting clutching device is further installed between the driven pulley and the output shaft of the high shift continuous variable transmission device of different shafts type.
Figure 11:
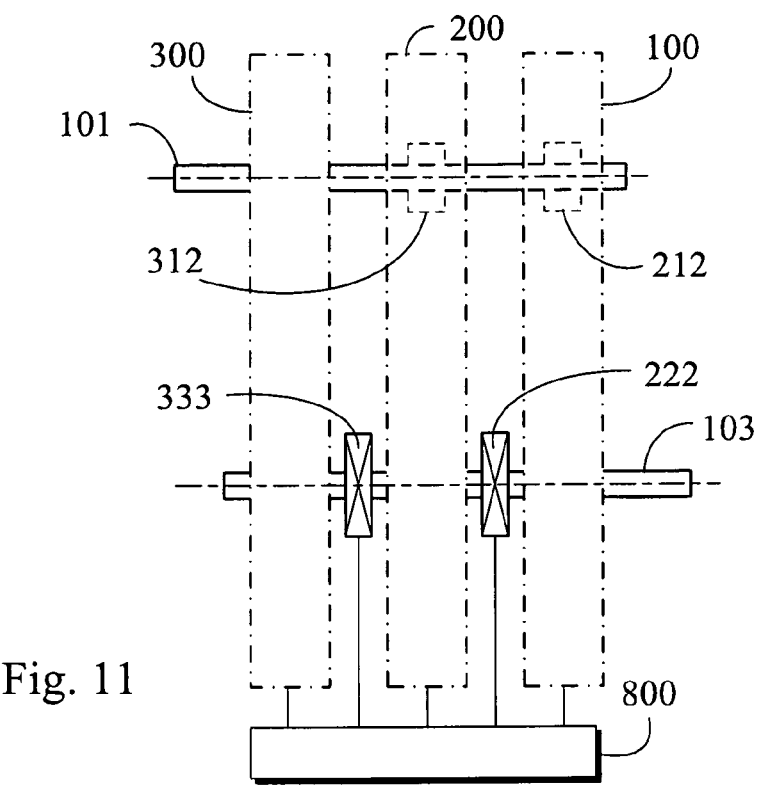
FIG. 11 is an embodiment schematic view of the invention showing that the structure in FIG. 3 is further installed with a higher shift continuous variable transmission device of different shafts type, and a clutching device is further installed between the driven pulley of the higher shift continuous variable transmission device of different shafts type and the output shaft driven by the driven pulley of the high shift continuous variable transmission device of different shafts type, as well as a torque limiting clutching device is further installed between the input shaft and the driving pulley of the high shift continuous variable transmission device of different shafts type.
Figure 12:
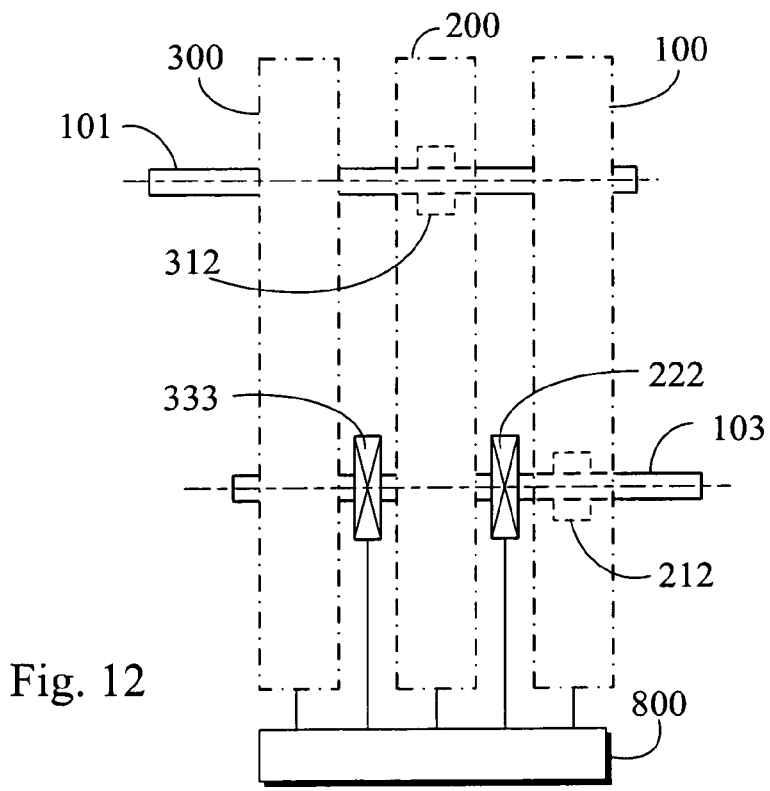
FIG. 12 is an embodiment schematic view of the invention showing that the structure in FIG. 4 is further installed with a higher shift continuous variable transmission device of different shafts type, and a clutching device is further installed between the driven pulley of the higher shift continuous variable transmission device of different shafts type and the output shaft driven by the driven pulley of the high shift continuous variable transmission device of different shafts type, as well as a torque limiting clutching device is further installed between the input shaft and the driving pulley of the high shift continuous variable transmission device of different shafts type

The operating speed of the clutching device 333 to close or release is higher than the operating speed of the clutching device 222 to close or release;

Further, 1) An unidirectional transmission device 211 can be optionally installed as needed between the driving pulley of the low shift continuous variable transmission device of different shafts type 100 and the input shaft 101 (as shown in FIGS. 6, 7), so that when the rotational speed of the driving pulley of the low shift continuous variable transmission device of different shafts type 100 is higher than that of the input shaft 101 in the same revolving direction, said unidirectional transmission device 211 is in no load operation; or 2) An unidirectional transmission device 211 can be optionally installed as needed between the driven pulley of the low shift continuous variable transmission device of different shafts type 100 and the output shaft 103 (as shown in FIGS. 5, 8), so that when rotational speed of the output shaft 103 of the low shift continuous variable transmission device of different shafts type 100 is higher than that of the driven pulley of the low shift continuous variable transmission device of different shafts type 100 in the same revolving direction, said unidirectional transmission device 211 is in no load operation; or 3) A torque limiting clutching device 212 can be optionally installed as needed between the driving pulley of the low shift continuous variable transmission device of different shafts type 100 and input shaft 101 (as shown in FIGS. 10, 11), whereby the torque limiting clutching device 212 is slid or released when there is a rotational speed difference causing torque difference to exceed the setting value between the driving pulley of the low shift continuous variable transmission device of different shafts type 100 and the input shaft 101; or 4) A torque limiting clutching device 212 can be optionally installed as needed to replace the unidirectional transmission device 211 between the driven pulley of the low shift continuous variable transmission device of different shafts type 100 and the output shaft 103 (as shown in FIGS. 9, 12), whereby the torque limiting clutching device 212 is slid or released when there is a rotational speed difference causing torque difference to exceed the setting value between the driven pulley of the low shift continuous variable transmission device of different shafts type 100 and the output shaft 103.

Said multi-stage continuous variable transmission device in multi-shift parallel connection transmission includes: 1) An unidirectional transmission device 311 can be optionally installed as needed between the driving pulley of the high shift continuous variable transmission device of different shafts type 200 and the input shaft 101 (as shown in FIGS. 7, 8), so that when the rotational speed of the driving pulley of the high shift continuous variable transmission device of different shafts type 200 is higher than that of the input shaft 101 in the same revolving direction, said unidirectional transmission device 311 is in no load operation; or 2) An unidirectional transmission device 311 can be optionally installed as needed between the driven pulley of the high shift continuous variable transmission device of different shafts type 200 and the output shaft 103 (as shown in FIGS. 5, 6), so that when rotational speed of the output shaft 103 is higher than the driven pulley of the high shift continuous variable transmission device of different shafts type 200 in the same revolving direction, said unidirectional transmission device 311 is in no load operation; or 3) A torque limiting clutching device 312 can be optionally selected to replace the unidirectional transmission device 311 (as shown in FIGS. 11, 12) to be installed as needed between the driving pulley of the high shift continuous variable transmission device of different shafts type 200 and the input shaft 101, whereby the torque limiting clutching device 312 is slid or released when there is a rotational speed difference causing torque difference to exceed the setting value between the driving pulley of the high shift continuous variable transmission device of different shafts type 200 and the input shaft 101; or 4) A torque limiting clutching device 312 can be optionally installed as needed between the driven pulley of the high shift continuous variable transmission device of different shafts type 200 and the output shaft 103 (as shown in FIGS. 9, 10), whereby the torque limiting clutching device 312 is slid or released when there is a rotational speed difference causing torque difference to exceed the setting value between the driven pulley of the high shift continuous variable transmission device of different shafts type 200 and the output shaft 103.

Said multi-stage continuous variable transmission device in multi-shift parallel connection transmission is constituted by a low shift continuous variable transmission device of different shafts type 100, a high shift continuous variable transmission device of different shafts type 200, and a higher shift continuous variable transmission device of different shafts type 300 as well as at least constituted by a clutching device 222 and a clutching device 333 as shown in the embodiments of FIGS. 5~12, wherein the driving control device 800 thereof is described in the following:

The driving control device 800 is installed according to characteristics of selected low shift continuous variable transmission device of different shafts type 100, high shift continuous variable transmission device of different shafts type 200, higher shift continuous variable transmission device of different shafts type 300, clutching device 222 and clutching device 333. Said driving control device is provided with a driving power source which is constituted by electric power supply unit, hydraulic oil pressure supply unit, or pneumatic pressure supply unit and relevant electric power control unit, hydraulic oil pressure control unit, or pneumatic pressure control unit to control the speed ratio of low shift continuous variable transmission device of different shafts type 100, the speed ratio of high shift continuous variable transmission device of different shafts type 200, as well as the speed ratio of higher continuous variable transmission device of different shafts type 300 or to control the closing or releasing operating function of the clutching device 222 and the closing or releasing operating function of the clutching device 333;

If automatic torque following speed ratio modulating mechanism, or rotational speed following speed ratio modulating mechanism are selected by the low shift continuous variable transmission device of different shafts type 100, the high shift continuous variable transmission device of different shafts type 200, and the higher shift continuous variable transmission device of different shafts type 300 for use as passively operated continuous variable transmission devices, or the passively operated centrifugal type clutching device is selected for the clutching device 222 and the clutching device 333, then the driving control device 800 is not needed to be installed;

If an active controlled type clutching device is selected for both or either of the clutching device 222 and the clutching device 333, or an actively operated continuous variable transmission device requiring an external power source for speed ratio modulation is selected for the three or at least one of low shift continuous variable transmission device of different shafts type 100 or high shift continuous variable transmission device of different shafts type 200, or higher shift continuous variable transmission device of different shafts type 300, then a driving control device 800 shall be installed to actively control the speed ratio of said continuous variable transmission device of different shafts type since an external power source is required for the speed ratio control, or to control the actively operated type clutching device 222 for closing or releasing functions whereof.

Said multi-stage continuous variable transmission device in multi-shift parallel connection transmission as described in FIGS. 1~12, wherein in practical applications, the unidirectional transmission devices 211 or 311, the torque limiting clutching devices 212 or 312 can be optionally mixed for use. Locations to install the unidirectional transmission device 211 or 311 or locations to install the torque limiting clutching device 212 or 312 can be 1) All locations selectively installed with the unidirectional transmission device 211 or 311 or 2) All locations selectively installed with the torque limiting clutching device 212 or 312, or 3) Partial locations selectively installed with the unidirectional transmission device 311 while other partial locations selectively installed with the torque limiting clutching device 312.

If said multi-stage continuous variable transmission device in multi-shift parallel connection transmission is constituted for applications in four or more than four stages of continuous variable transmission devices, said constitutions whereof as well as functions and operating relationships of the matched driving control device 800 whereof can be inferred by the relationship of the three stage type one shown in above FIGS. 5~12.

Figure 13:
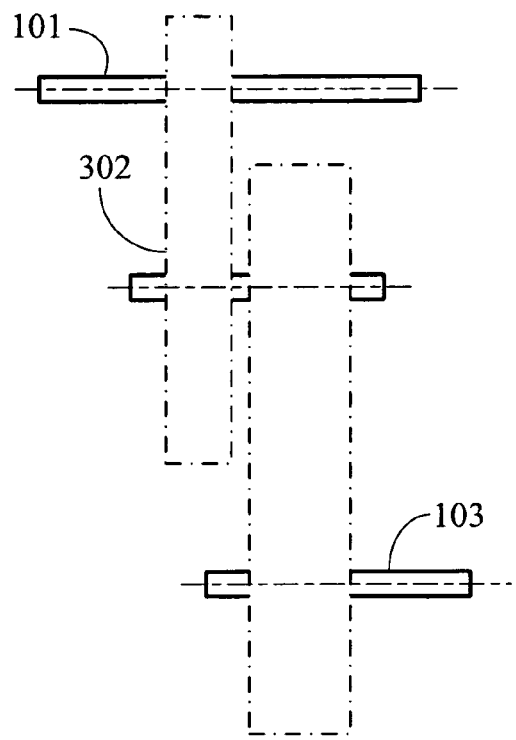
FIG. 13 is a schematic view of the invention showing that a speed change pulley train structure is further installed between the input shaft 101 and the driving pulley of the low shift continuous variable transmission device of different shafts type, between the input shaft and the driving pulley of the high shift continuous variable transmission device of different shafts type, or between the input shaft and the driving pulley of the higher shift continuous variable transmission device of different shafts type.
Figure 14:
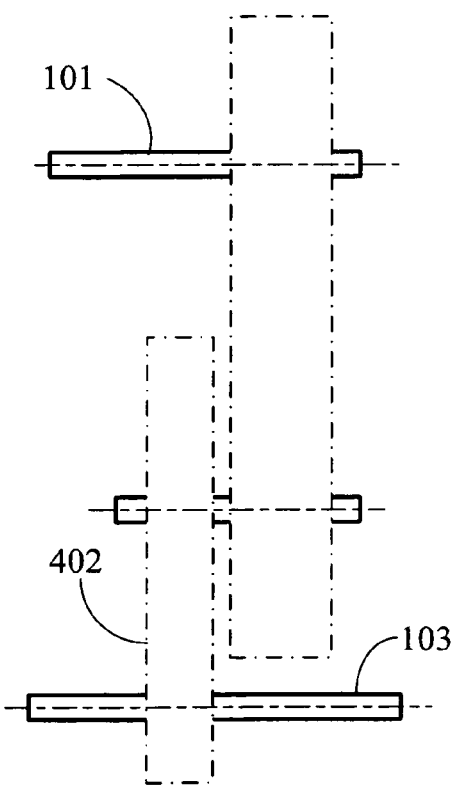
FIG. 14 is a schematic view of the invention showing that a speed change pulley train structure is further installed between the output shaft and the driven pulley of the low shift continuous variable transmission device of different shafts type, between the output shaft and the driven pulley of the high shift continuous variable transmission device of different shafts type, or between the output shaft and the driven pulley of the higher shift continuous variable transmission device of different shafts type.
Figure 15:
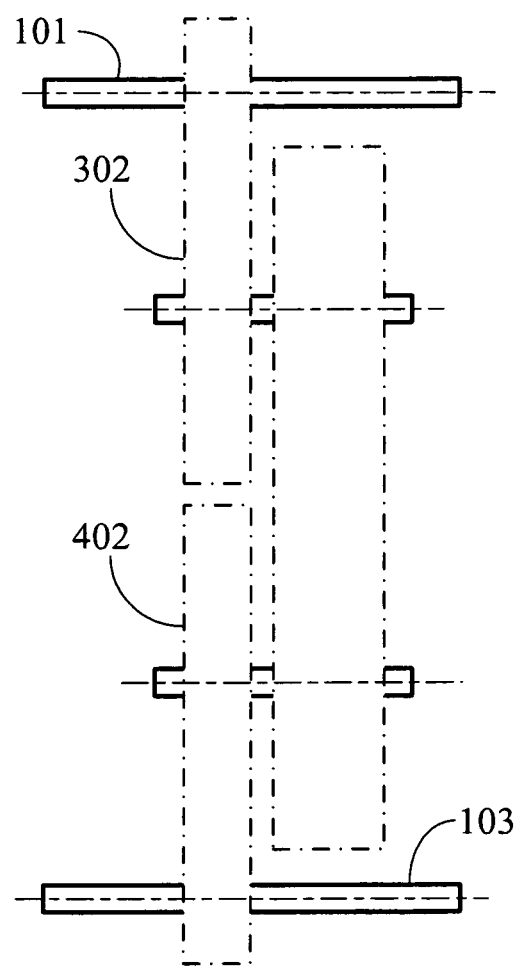
FIG. 15 is a schematic view of the invention showing that a speed change pulley train structure is further installed between the input shaft and the driving pulley of the low shift continuous variable transmission device of different shafts type, and between the output shaft and the driven pulley of the low shift continuous variable transmission device of different shafts type; installed between the input shaft and the driving pulley of the high shift continuous variable transmission device of different shafts type, and between the output shaft and the driven pulley of the high shift continuous variable transmission device of different shafts type; or installed between the input shaft and the driving pulley of the higher shift continuous variable transmission device of different shafts type and between the output shaft and the driven pulley of the higher shift continuous variable transmission device of different shafts type.

Further, the known transmission efficiency of driving and driven pulleys of the continuous variable transmission device of different shafts type is affected by their outer diameter ratio in operation, the larger outer diameter ratio leads to larger speed ratio in operation but with poorer transmission efficiency. The continuous variable transmission device with driving pulley and driven pulley of more similar diameter ratios in operation can be used for every stage of continuous variable transmission devices of different shafts type including low shift continuous variable transmission device of different shafts type 100, high shift continuous variable transmission device of different shafts type 200, or higher shift continuous variable transmission device of different shafts type 300, wherein a continuous variable transmission device with close outer diameter ratio between driving pulley and driven pulley in operation can be adopted and a middle transmission pulleys can be further installed between the input shaft 101 and the driving pulley of the continuous variable transmission device, or between the output shaft 103 and the driven pulley of the continuous variable transmission device to increase or decrease their speed ratios while still maintaining better transmission efficiencies, wherein the middle transmission pulleys include:

1. The speed change pulley train 302 is installed 1) between the input shaft 101 and the driving pulley of the low shift continuous variable transmission device of different shafts type 100, or 2) between the input shaft 101 and the driving pulley of the high shift continuous variable transmission device of different shafts type 200, or 3) between the input shaft 101 and the driving pulley of the higher shift continuous variable transmission device of different shafts type 300, thereby to change their total speed ratio and to match with revolving direction as needed. FIG. 13 is a schematic view of the invention showing that a speed change pulley train structure is further installed 1) between the input shaft 101 and the driving pulley of the low shift continuous variable transmission device of different shafts type 100, or 2) between the input shaft 101 and the driving pulley of the high shift continuous variable transmission device of different shafts type 200, or 3) between the input shaft 101 and the driving pulley of the higher shift continuous variable transmission device of different shafts type 300; or 2. The speed change pulley train 402 is installed 1) between the output shaft 103 and the driven pulley of the low shift continuous variable transmission device of different shafts type 100, or 2) between the output shaft 103 and the driven pulley of the high shift continuous variable transmission device of different shafts type 200, or 3) between the output shaft 103 and the driven pulley of the higher shift continuous variable transmission device of different shafts type 300; thereby to change their total speed ratio and to match with revolving direction as needed. FIG. 14 is a schematic view of the invention showing that a speed change pulley train structure is further installed 1) between the output shaft 103 and the driven pulley of the low shift continuous variable transmission device of different shafts type 100, or 2) between the output shaft 103 and the driven pulley of the high shift continuous variable transmission device of different shafts type 200, or 3) between the output shaft 103 and the driven pulley of the higher shift continuous variable transmission device of different shafts type 300; or 3. The speed change pulley trains 302, 402 are simultaneously installed 1) between the input shaft 101 and the driving pulley of the low shift continuous variable transmission device of different shafts type 100, and between the output shaft 103 and the driven pulley of the low shift continuous variable transmission device of different shafts type 100; or 2) simultaneously installed between the input shaft 101 and the driving pulley of the high shift continuous variable transmission device of different shafts type 200, and between the output shaft 103 and the driven pulley of the high shift continuous variable transmission device of different shafts type 200; or 3) simultaneously installed between the input shaft 101 and the driving pulley of the higher shift continuous variable transmission device of different shafts type 300 and between the output shaft 103 and the driven pulley of the higher shift continuous variable transmission device of different shafts type 300, thereby to change their total speed ratio and to match with revolving direction as needed. FIG. 15 is a schematic view of the invention showing that a speed change pulley train structure is further installed 1) between the input shaft 101 and the driving pulley of the low shift continuous variable transmission device of different shafts type 100, and between the output shaft and the driven pulley of the low shift continuous variable transmission device of different shafts type 100; or 2) installed between the input shaft 101 and the driving pulley of the high shift continuous variable transmission device of different shafts type 200, and between the output shaft 103 and the driven pulley of the high shift continuous variable transmission device of different shafts type 200; or 3) installed between the input shaft 101 and the driving pulley of the higher shift continuous variable transmission device of different shafts type 300 and between the output shaft 103 and the driven pulley of the higher shift continuous variable transmission device of different shafts type 300.

The practical applied structure of said multi-stage continuous variable transmission device in multi-shift parallel connection transmission can be selectively mainly constituted by two continuous variable transmission devices of different shafts type in different speed ratios, at least one clutching device, at least one unidirectional transmission device, at least one torque limiting clutching device, wherein all or part of the main structures thereof can be made to be independently separated mechanical devices and combined afterwards for transmission or made to an integral structure or made to a structure of a common integrated mechanical device and a common used casing.

As summarized from above descriptions, said multi-stage continuous variable transmission device in multi-shift parallel connection transmission is characterized in that at least one stage or more stages relatively higher continuous variable transmission device of different shafts type is installed and neighborly parallel connected with the low shift continuous variable transmission device of different shafts type, wherein along with the gradually acceleration of the input shaft, the clutching devices between the driven pulleys of the relatively higher continuous variable transmission devices of different shafts type and the output shaft are operated to close sequentially, so that revolving kinetic energy is transmitted by the relatively higher continuous variable transmission devices of different shafts type via the output shaft 103 to accelerate on the load, or in case of heavy loading, the revolving kinetic energy is decelerated due to load increase, said clutching devices are sequentially released; thereby the speed ratio range of the continuous variable transmission device of said multi-stage continuous variable transmission device in multi-shift parallel connection transmission is enlarged by the said operation and control.

The invention claimed is:

1. A multi-stage transmission with at least two parallel continuously variable transmission (CVT) devices, comprising:
    a low shift different-shaft-type CVT device having a low shift driving pulley and a low shift driven pulley, said low shift driving pulley and low shift driven pulley having a first continuously variable speed ratio;
    at least a high shift different-shaft-type CVT device having a high shift driving pulley and a high shift driven pulley, said high shift driving pulley and high shift driven pulley having a second continuously variable speed ratio;
    an input shaft connected to the low shift driving pulley and the high shift driving pulley;
    an output shaft connected to the low shift driven pulley of the low shift different-shaft-type CVT device;
    a clutch device for selectively engaging and disengaging the high shift driven pulley of the high shift different-shaft-type CVT device and the output shaft; and
    a unidirectional transmission device or torque-limiting clutch device connected between one of the input shaft and output shaft and a respective one of the low shift driving pulley and the low shift driven pulley,
    wherein at low speeds or loads, the clutch is open to disengage the high shift driven pulley high shift different-shaft-type CVT device and drive the output shaft exclusively through the low shift CVT device, and when the low shift CVT device is a deceleration type CVT device operated at or close to a minimum deceleration ratio or an acceleration type CVT device operated at or close to a maximum acceleration ratio, then when a rotational speed of the output shaft reaches or exceeds a predetermined speed, the clutch is closed to connect the high shift driven pulley and the output shaft such that said output shaft is driven at a speed ratio of the high shift transmission device.

2. A continuously variable transmission as claimed in claim 1, further comprising at least one additional higher shift CVT device having a higher shift driving pulley and a higher shift driven pulley, wherein additional unidirectional transmission devices or torque-limiting clutch devices are included in each additional higher shift CVT device except for a highest shift CVT device.

3. A continuously variable transmission as claimed in claim 2, wherein when driving pulleys of the low shift, high shift, and higher shift CVT devices are driven at a same rotational speed, the rotational speed output of the driven pulley of each CVT device due to speed ratio differences of the CVT devices, as follows:
(a) a highest rotational speed output of the driven pulley of the low shift CVT device<a highest rotational speed output of the driven pulley of the high shift CVT device<a highest rotational speed output of the driven pulley of the higher shift CVT device; and
(b) a lowest rotational speed output of the driven pulley of the low shift CVT device<a lowest rotational speed output of the driven pulley of the high shift continuously variable transmission device<a lowest rotational speed output of the driven pulley of the higher shift CVT device.

4. A continuously variable transmission as claimed in claim 2, further comprising a driving control device for controlling the speed ratios of the low shift and high shift CVT devices and/or for controlling closing or releasing operations of the clutch, said driving control device including a driving power source constituted by an electric power supply unit hydraulic oil pressure supply unit, or pneumatic pressure control unit.

5. A continuously variable transmission as claimed in claim 1, wherein said low shift and high shift CVT devices are passively operated and do not require a driving control device.

6. A continuously variable transmission as claimed in claim 1, wherein at least one of said low shift and high shift CVT devices is one of the following types of continuously variable transmission: rubber belt, metal belt, chain, electronic (ECVT), or friction disc type of CVT device.

7. A continuously variable transmission as claimed in claim 1, wherein a speed ratio of at least one of the CVT devices is actively modulated by applying a linear driving force generated by an external linear driving device or a revolving driving device via a mechanical transmission device to change a spacing between V-belt grooves of either or both of the CVT driving pulley or the CVT driven pulley.

8. A continuously variable transmission as claimed in claim 1, wherein the speed ratio of the continuously variable transmission device is automatically passively modulated by following torque or rotational speed.

9. A continuously variable transmission as claimed in claim 1, wherein the unidirectional transmission device or torque limiting clutch device is a unidirectional transmission bearing, clutch, or mechanism with a radial or axial structure.

10. A continuously variable transmission as claimed in claim 9, wherein the unidirectional transmission device is installed between the low shift driven pulley and the output shaft such that when a rotational speed of the low shift driven pulley is higher than a rotational speed of the output shaft in the same revolving direction, kinetic energy is transmitted from the low shift driven pulley to the output shaft, and when the clutch is closed so that the output shaft and the high shift driven pulley is connected, if the rotational speed of the output shaft is higher than the rotational speed of the low shift driven pulley, then the unidirectional transmission device is in no load operation.

11. A continuously variable transmission as claimed in claim 9, wherein the unidirectional transmission device is installed between the low shift driving pulley and the output shaft such that when a rotational speed of the low shift driven pulley is lower than a rotational speed of the input shaft in the same revolving direction, kinetic energy is transmitted from the input shaft to the low shift driven pulley, and when the clutch is closed so that the output shaft and the high shift driven pulley is connected, if the rotational speed of the output shaft is lower than the rotational speed of the low shift driving pulley, then the unidirectional transmission device is in no load operation.

12. A continuously variable transmission as claimed in claim 1, wherein said unidirectional transmission device or torque limiting clutch device is a radial or axial, sliding or clutching type torque limiting device installed between the low shift driven pulley and the output shaft of between the low shift driving pulley and the input shaft such that when the rotational speed of the output shaft is raised to or exceeds a predetermined speed and the clutch is closed, the torque limiting clutch device is slid or released when a rotational speed difference or torque difference between the output shaft and the driven pulley or the input shaft and the driving pulley exceeds a set difference.

13. A continuously variable transmission as claimed in claim 1, wherein said clutch is (a) passively operated by centrifugal force or torque or (b) actively operated by manual, mechanical, or electromagnetic power, or hydraulic or pneumatic pressure, in response to manual control or feedback from a speed or torque detector.

14. A continuously variable transmission as claimed in claim 1, wherein the clutch is an independent device or integrated with one of the low shift or high shift CVT devices.

15. A continuously variable transmission as claimed in claim 1, wherein the unidirectional transmission device is installed between the low shift driving pulley and the output shaft such that (a) when the clutch is released and a rotational speed of the output shaft is lower than a rotational speed of the low shift driven pulley of the low shift different-shaft-type CVT device in the same revolving direction, the unidirectional transmission operated for kinetic energy transmission; (b) when the clutch is closed because the rotational speed of the low shift output shaft has exceeded a preset speed, and the output shaft is driven by the high shift driven pulley through the clutch at a rotational speed that is higher than a rotational speed of the low shift driven pulley in the same revolving direction, then the rotational speed of the output shaft can be further accelerated by the input shaft to drive a load, the kinetic energy originally transmitted by the low shift CVT device being caused to instead be transmitted by the high shift CVT device and clutch to the output shaft; (c) when the rotational speed of the output shaft is gradually reduced to the preset rotational speed, the clutch is released, and the kinetic energy of the input shaft is again transmitted by the low shift CVT device to drive the output shaft and further drive the load, and (d) when the clutch is released and a rotational speed of the output shaft is higher than a rotational speed of the low shift driven pulley of the low shift different-shaft-type CVT device in the same revolving direction, the unidirectional transmission is in no load operation.

16. A continuously variable transmission as claimed in claim 1, further comprising a higher speed CVT device, wherein a maximum speed ratio of the higher shift CVT device is larger than a maximum speed ratio of the high shift CVT device; a minimum speed ratio of the higher shift CVT device is also larger than a minimum speed ratio of the high shift CVT device; a driving pulley of the higher shift CVT device is driven by the input shaft; a second clutch is installed between a driven pulley of the higher shift CVT device and the high shift driven pulley; and a speed at which the second clutch closes or releases is higher than a speed at which the first clutch closes or releases.

17. A continuously variable transmission as claimed in claim 16, further comprising at least one even higher speed CVT device.

18. A continuously variable transmission as claimed in claim 1, further comprising one or more middle transmission pulleys between the input shaft and the driving pulley, or the driven pulley and the output shaft, of either or both of the low shift and high speed CVT devices.

19. A continuously variable transmission as claimed in claim 18, wherein the middle transmission pulleys constitute one of;

(a) a speed change pulley train installed between the input shaft and the low shift driving pulley or high shift driving pulley to change total speed of the low shift and high shift driving pulleys and/or change a rotating direction as needed;

(b) a speed change pulley train installed between the output shaft and the low shift driving pulley or high shift driving pulley to change said total speed and/or rotating direction; and (c) a speed change pulley train installed between the input shaft and the low shift driving pulley or high shift driving pulley and also between the output shaft and the low shift or high shift driving pulley to change said total speed and/or rotating direction of one or both of the low shift or high shift driving and driven pulleys.

20. A continuously variable transmission as claimed in claim 1, wherein said low shift and high shift CVT devices are separate devices, integrated devices, or integrated devices in a common casing.

* * * * *